March 13, 1934.   J. W. HOUSTON   1,950,984
LUBRICATING DEVICE FOR DOORS AND THE LIKE
Filed July 19, 1933

Inventor
Junius W. Houston,
By Owen & Owen,
Attorneys

UNITED STATES PATENT OFFICE

1,950,984

LUBRICATING DEVICE FOR DOORS AND THE LIKE

Junius W. Houston, Toledo, Ohio, assignor to General Motors Corporation, Detroit, Mich., a corporation of Delaware Application July 19, 1933, Serial No. 681,345

1 Claim. (Cl. 16—86)

This invention relates to a lubricating device which is especially adapted to be used in connection with the means used for holding vehicle doors in closed position.

The object of the invention is to eliminate, as far as possible, the noise and friction caused by the contact of one metal surface with another, at the same time avoiding the use of oil or other lubricant in sufficient quantity to spread or to be rubbed off onto the clothes of persons using the door.

It is also an important object of the invention to provide practical and improved means for maintaining a supply of lubricant in such a manner that it will be applied in a very thin film to one of the coengaging surfaces upon relative movement thereof, and to provide convenient means for replenishing the supply when necessary.

In the present application the invention is described as applied to that part of a vehicle door which is commonly termed a dove tail and which is forced between two yieldable buffers as the door closes. This application corresponds to applicant's previously allowed application, Serial No. 283,321, which became forfeited and was not renewed.

In the accompanying drawing, Figure 1 is a perspective view of a dove tail member secured to a vehicle door, with the invention applied thereto;

Figure 1:
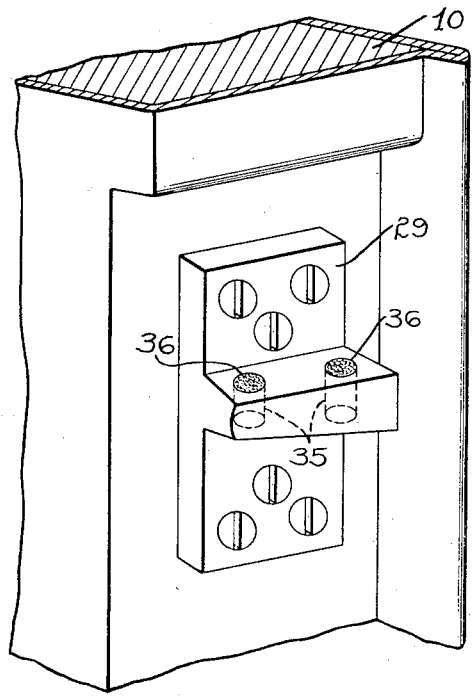
Figure 2:
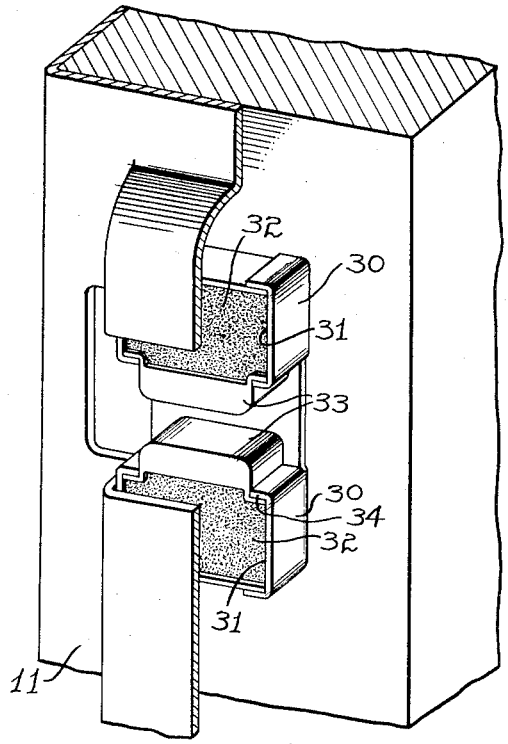
Figure 2 is a perspective view of a portion of the door jamb, showing the buffers with which the dove tail member cooperates.

As illustrated in the drawing, the numeral 10 indicates a portion of an automobile door which is associated with a door frame 11. A member 28, which is commonly termed a dove tail, is formed on a plate 29 which is secured to the free edge of the door 10.

Figure 3:
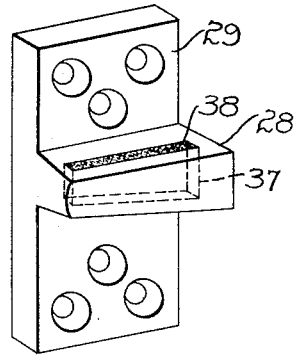
Figure 3 is a perspective view of a slightly modified form of the invention as applied to the dove tail.

As the door closes, the member 28 engages the buffer device, which is mounted on the adjacent portion of the door frame 11. This buffer device, in the form herein shown, comprises a housing 30, which is secured to the door frame 11, and which is formed with opposed recesses 31, in which are mounted cushions 32 of rubber or similar material. The opposed surfaces of these cushions are covered by metallic shells 33, which are adapted to receive the dove tail 28 between them. The movement of the cushions toward each other is limited by shoulders 34 formed at the edges of the recesses 31. The dove tail 28 may be provided with one or more bores 35 extending therethrough and adapted to receive round wicks 36, the ends of which will be substantially flush with the upper and lower faces of the dove tail, so as to come in wiping contact with the metallic ends 33 of the cushions whenever the door is closed or opened. If desired, the dove tail 28 may be provided with a milled slot 37, as illustrated in Fig. 3, in place of the bores 35. A flat wick 38 will be fitted in the slot 37.

From the foregoing description, it will be seen that I have provided a lubricating device which is particularly well adapted for use in a dove tail, or in any similar member having oppositely facing upper and lower surfaces and adapted to move in a channel between two opposed metallic surfaces which it frictionally engages. The ends of the wicks 36 and 38 are substantially flush with the surfaces of the dove tail and should be supplied with sufficient lubricant so that a very thin film will be applied to the surfaces of the shells 33, but there should not be enough lubricant for it to accumulate at the ends of the wicks. When the invention is used in this manner, it causes the distribution of a thin film of oil to the surfaces over which the wicks pass, thus reducing the friction which causes the usual squeaking of doors, as well as permitting the doors to be opened with less effort. There will not be enough lubricant, however, to soil the clothes of any person coming in contact therewith.

Wherever two metallic surfaces contact with each other, either one of the members may be provided with a lubricant-carrying wick adapted to have wiping contact with the other.

The size and shape of the wick will, of course, correspond to the hole in which it is used. It will be apparent, however, that the invention is not limited to any specific shape or size of parts, or to any specific adaptation thereof, but includes such modifications as may fall within the scope of the appended claim.

What I claim is:

A dovetail construction having a projecting member provided with oppositely disposed wear surfaces adapted to enter a receiving member shaped to fit said surfaces, said projecting member being transversely apertured to provide an opening in each of the wear surfaces, and lubricant-impregnated absorbent material in the aperture arranged substantially flush with each wear surface for lubricating said members during relative movement thereof.

JUNIUS W. HOUSTON.